(12) United States Patent
Sato (10) Patent No.: US 7,180,610 B2
(45) Date of Patent: Feb. 20, 2007

(54) FACSIMILE APPARATUS

(75) Inventor: Yasunori Sato, Numazu (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 892 days.

(21) Appl. No.: 09/952,101

(22) Filed: Sep. 14, 2001

(65) Prior Publication Data

US 2002/0036806 A1 Mar. 28, 2002

(30) Foreign Application Priority Data

Sep. 27, 2000 (JP) .............................. 2000-294184

(51) Int. Cl.
*H04N 1/32* (2006.01)
(52) U.S. Cl. ..................................... 358/1.12; 358/468
(58) Field of Classification Search ................. 358/1.9, 358/1.12, 2.1, 486, 488, 449–450, 468, 408, 358/474
See application file for complete search history.

(56) References Cited

U.S. PATENT DOCUMENTS

| | | | | | |
|---|---|---|---|---|---|
| 4,496,142 | A | * | 1/1985 | Iwasaki | ...................... 271/3.03 |
| 5,243,439 | A | * | 9/1993 | Jacobus et al. | ............. 358/448 |
| 5,408,340 | A | * | 4/1995 | Edamura | ..................... 358/468 |
| 5,532,847 | A | * | 7/1996 | Maruyama | ................... 358/498 |
| 5,713,061 | A | * | 1/1998 | Yoshioka | ...................... 399/38 |
| 6,415,117 | B1 | * | 7/2002 | Bates et al. | ................... 399/84 |

FOREIGN PATENT DOCUMENTS

EP  860983 A1 * 8/1998
JP  2000270190 A * 9/2000

* cited by examiner

*Primary Examiner*—Thomas D. Lee
*Assistant Examiner*—Stephen Brinich
(74) *Attorney, Agent, or Firm*—Frishauf, Holtz, Goodman & Chick, P.C.

(57) ABSTRACT

When transmission of an image is performed by a double-side image transmitting function, and a cover sheet inserting function is used to automatically insert a cover sheet, a CPU transmits a blank sheet image as the image formed on the reverse side of the cover sheet.

30 Claims, 9 Drawing Sheets

| Bit No. | Page information | |
|---|---|---|
| 0 | Page value | 0: Obverse side<br>1: Reverse side |
| 1 | Reserved | |
| 2 | Reserved | |
| 3 | Reserved | |
| 4 | Reserved | |
| 5 | Reserved | |
| 6 | Previous page transmission skipping bit | 0: No skipping<br>1: Skipped |
| 7 | Extended bit | |

'01-01-01 12:00 Address-Sales Division Transmitter-Planning Division P.002/006

FIG. 10

FACSIMILE APPARATUS

CROSS-REFERENCE TO RELATED APPLICATIONS

This application is based upon and claims the benefit of priority from the prior Japanese Patent Application No. 2000-294184, filed Sept. 27, 2000, the entire contents of which are incorporated herein by reference.

BACKGROUND OF THE INVENTION

1. Field of the Invention

The present invention relates to a facsimile apparatus that can utilize a double-side communication protocol conforming, for example, to ITU-T Recommendation T.30 to perform facsimile communication.

2. Description of the Related Art

Two modes are defined in the double-side communication protocol conforming to ITU-T Recommendation T.30. They are alternate mode and continuous mode.

In the alternate mode, an image on the obverse side of each original sheet and an image on the reverse side thereof are alternately transmitted. In the continuous mode, the image on the obverse side of the original sheet is first continuously transmitted, and the image on the reverse side thereof is then continuously transmitted.

In either mode, consecutive page numbers are sequentially assigned to respective images. More precisely, page number 1 is assigned to the image on the obverse side of first sheet; page number 2 to the image on the reverse side of the first sheet; page number 3 to the image on the observes side of the second sheet; page number 4 to the image on the reverse side of the second sheet; and so forth. The page number is transmitted in the form of a PPS message (communication procedure), immediately after the image data, from the transmission side to the reception side. Furthermore, it is also notified to the reception side from the transmission side via the PPS message that each image belongs to the obverse side or reverse side of the original sheet.

In the reception side, two images identical to those read from the obverse and reverse sides of each original sheet in the transmission side can be printed on the obverse and reverse sides of a sheet, in accordance with the PPS messages that show the page number and which image is printed on which side obverse side.

Additionally, the facsimile apparatus can automatically add and transmit the image of a cover sheet which is stored in a memory as first-page image.

When the cover-sheet adding function is utilized in transmitting the images on both side of each original sheet, the images of the original sheets, actually read, are transmitted as the second page et seq. The respective images are sequentially numbered, and the first image is numbered as "page 3."

Since only a top one page of the image on the obverse side is added as the cover sheet, however, the image of the reverse side of the first page (page number "2") is not transmitted.

Assume that the page numbers of the incoming images are checked. Any page missing is detected as a communication error in the reception side. In this case, the cover sheet may be added and the image having page number "2" may not be transmitted as described above. This will be detected as a communication trouble.

To solve the problem, no check may be made for any possible page missing. In this case, however, even the page missing due to a communication trouble cannot be detected, remarkably deteriorating the reliability of communication.

Moreover, when double-side image transmission is performed, the images on both sides of any original sheet are regarded as objects to be transmitted.

Therefore, even the reverse side of the cover sheet is scanned and the image on this side is transmitted when the cover-sheet adding function is not used and the user prepares the cover sheet and adds it to the original sheet before the images of the original sheet is transmitted.

Generally, information is formed on only one side of the cover sheet. In many cases, the cover sheet is not be used again after the image on the original sheet has been transmitted. Therefore, a sheet already used the reverse side is used as the cover sheet, and the information of the cover sheet is formed on the obverse side. Even the image on the reverse side, which should not be transmitted, is inevitably transmitted during the double-side image transmission.

BRIEF SUMMARY OF THE INVENTION

An object of the present invention is to transmit images formed on both sides of an original sheet so that the original can correctly be reproduced in the reception side, and to detect a missing page, if any, so that image communication can reliably be performed.

The object is achieved by a facsimile apparatus comprising: a double-side image transmitting section configured to set an image formed on one side of an original sheet as an original image for one page, and to transmit respective original images formed on the obverse and reverse sides of each original sheet; an additional page transmitting section configured to automatically transmit a predetermined additional image for one page, registered in a predetermined position of a plurality of pages of images obtained from the original; and a reverse-side image transmitting section configured to automatically transmit a predetermined reverse-side image as the image on the revere side of the additional page transmitted by the additional page transmitting section.

Moreover, the object is also attained by a facsimile apparatus comprising: a double-side image transmitting section configured to set an image formed on one side of an original sheet as an original image for one page, and to transmit images formed on the obverse and reverse sides of each original sheet; an additional page transmitting section configured to automatically transmit a predetermined additional image for one page, registered in a predetermined position of a plurality of pages of images obtained from the original; and a no-image notifying section configured to skip transmission of an image as a reverse side of the additional image transmitted by the additional page transmitting section, and to transmit predetermined information for notifying a reception side that the transmission of the image has been skipped.

Furthermore, the object is achieved by a facsimile apparatus comprising: a reading section configured to set an image formed on one side, as an original image for one page, and to read the original images formed on the obverse and reverse sides of an original sheet of an original; a double-side image transmitting section configured to transmit the respective original images read by the reading section; and a reverse-side image transmitting section configured to transmit a predetermined reverse-side image not related to the original image read by the reading section, as a reverse-side image formed on a predetermined original sheet of the original set in the reading section.

Additionally, the object is realized by a facsimile apparatus comprising: a reading section configured to set an image formed on one side as an original image for one page and to read the original images formed on the obverse and reverse sides of each sheet of an original; a double-side image transmitting section configured to transmit the original images read by the reading section; and a no-image notifying section configured to skip transmission of the original image read by the reading section from the reverse side of a predetermined original among the original set in the reading section, and to transmit predetermined information for notifying a reception side that the transmission of the original image has been skipped.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Preferred embodiments of the present invention will be described, with reference to the drawings.

(First Embodiment)

Figure 1:
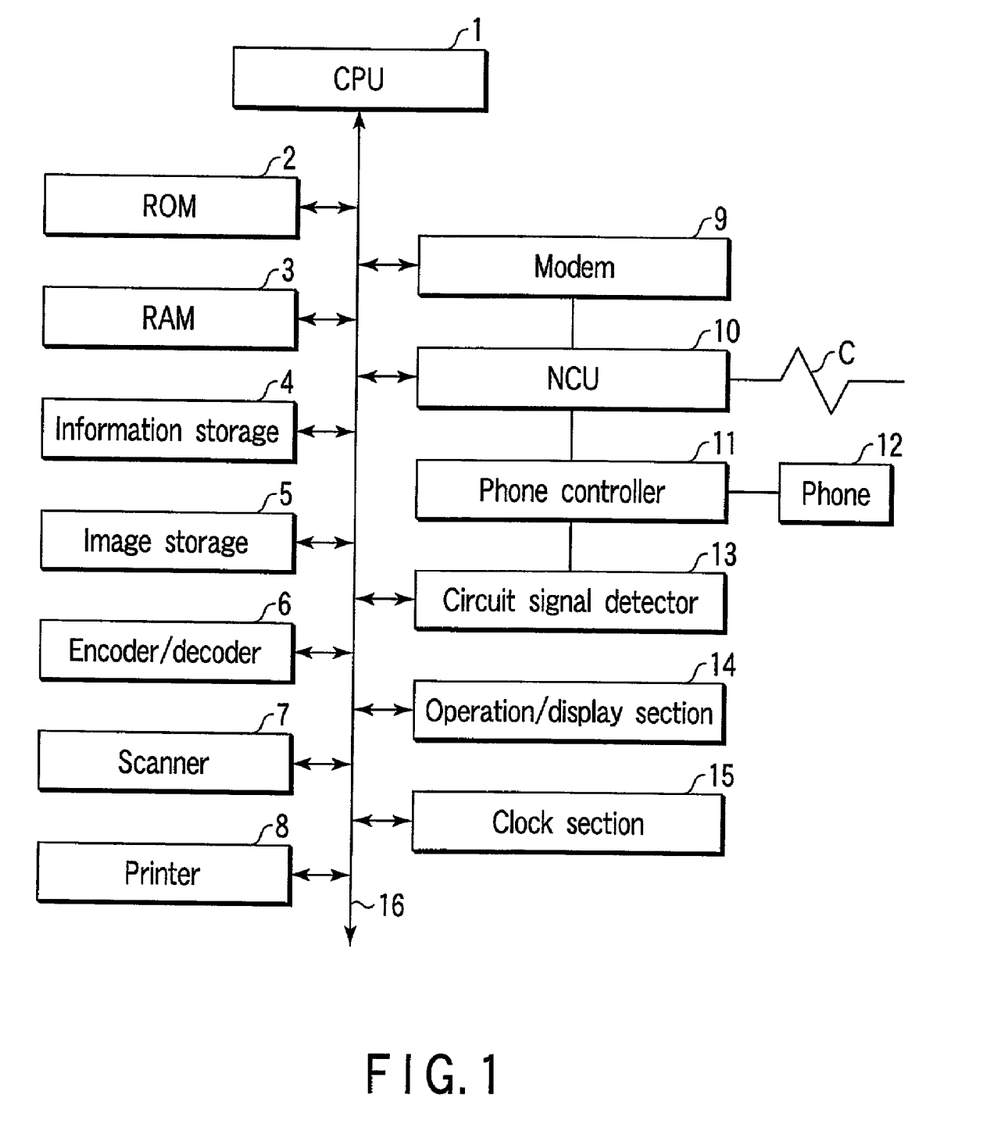
FIG. 1 is a function block diagram showing a main part of a facsimile apparatus according to a first embodiment of the present invention.

FIG. 1 is a function block diagram showing the main part of a facsimile apparatus according to the first embodiment of the present invention.

As shown in FIG. 1, the facsimile apparatus includes a CPU 1, ROM 2, RAM 3, information storage 4, image storage 5, encoder/decoder 6, scanner 7, printer 8, modem 9, NCU 10, phone controller 11, phone 12, circuit signal detector 13, operation/display section 14 and clock section 15.

Moreover, the CPU 1, ROM 2, RAM 3, information storage 4, image storage 5, encoder/decoder 6, scanner 7, printer 8, modem 9, NCU 10, circuit signal detector 13, operation/display section 14 and clock section 15 are connected to one another by a system bus 16. The NCU 10 is connected to the modem 9 and phone controller 11. The phone controller 11 is further connected to the phone 12 and circuit signal detector 13.

The CPU 1 controls the components, based on a control program that is stored in the ROM 2. Thus, the facsimile apparatus operates as is desired.

The ROM 2 stores the control program of the CPU 1, and the like.

The RAM 3 may be a DRAM or a SRAM. Moreover, the RAM 3 is used to store various information necessary for the CPU 1 to perform various process.

The information storage 4 comprises, for example, of a flash memory or the like. The information storage 4 stores various setting information and other information.

The image storage 5 is constituted, for example, of a large-capacity DRAM, hard disk apparatus, or the like. The image storage 5 temporarily stores the image data received or the image data to be transmitted. A part of a storage area of the image storage 5 is used as an area for storing an image for a cover sheet registered beforehand.

The encoder/decoder 6 encodes image data for compressing redundancy, and decodes the image data thus encoded.

The scanner 7 reads an original to be transmitted, generating image data representing the original. Moreover, the scanner 7 has a double-side reading function of reading both sides of the original. That is, the scanner 7 functions as a reading section.

The printer 8 prints the image represented by the image data on a print sheet. Moreover, the printer 8 has a double-side printing function of printing images on both sides of the print sheet.

The modem 9 modulates the image data, generating a facsimile signal, and modulates a command given by the CPU 1, generating a command signal. The facsimile signal and the command signal are supplied to a PSTN subscriber line C via the NCU 10. The modem 9 demodulates facsimile data supplied from the PSTN subscriber line C via the NCU 10, reproducing the image data, and demodulates the command signal, reproducing the command.

The NCU 10 is connected to the PSTN subscriber line C that is provided in PSTN (not shown). The NCU 10 monitors the connected PSTN subscriber line C, thereby to determine whether signals can be transmitted to the line C and thence to a network. Furthermore, the NCU 10 equalizes the facsimile signal to be transmitted to the PSTN subscriber line C, and sets the signal at a specific level.

The phone controller 11 performs the known control to perform communication via the PSTN subscriber line C by the use of the phone 12.

The circuit signal detector 13 receives a signal from the PSTN subscriber line C via the NCU 10 and phone controller 11, and detects the arrival of a predetermined signal.

The operation/display section 14 includes a key input section and a display. The user operates the key input section receives to input various instruction inputs to the CPU 1. The display displays various information to be notified to the user under control of the CPU 1.

The clock section 15 keeps performing a timing operation. It outputs the information indicating the present time.

Since the CPU 1 operates based on the control program stored in the ROM 2, it operates not only as a control section for realizing a known function of the facsimile apparatus, but also as a double-side image transmitting section, additional page transmitting section and reverse-side image transmitting section.

The double-side image transmitting section sets the image formed on one side of the original as the original image for one page, and transmits the respective original images formed on both sides of each original sheet of an original consisting of at least one page of original.

The additional page transmitting section automatically transmits the image formed on a predetermined cover sheet, for one page registered in a predetermined position of a plurality of pages of images obtained from the original.

Moreover, the reverse-side image transmitting section automatically transmits a blank sheet image as the image of the reverse side of the predetermined image transmitted by the additional page transmitting section.

How the facsimile apparatus operates will be described below.

The basic operation of the facsimile apparatus is similar to that of a conventional facsimile apparatus. Therefore, only the operation that characterizes the present invention will be described.

Figure 2:
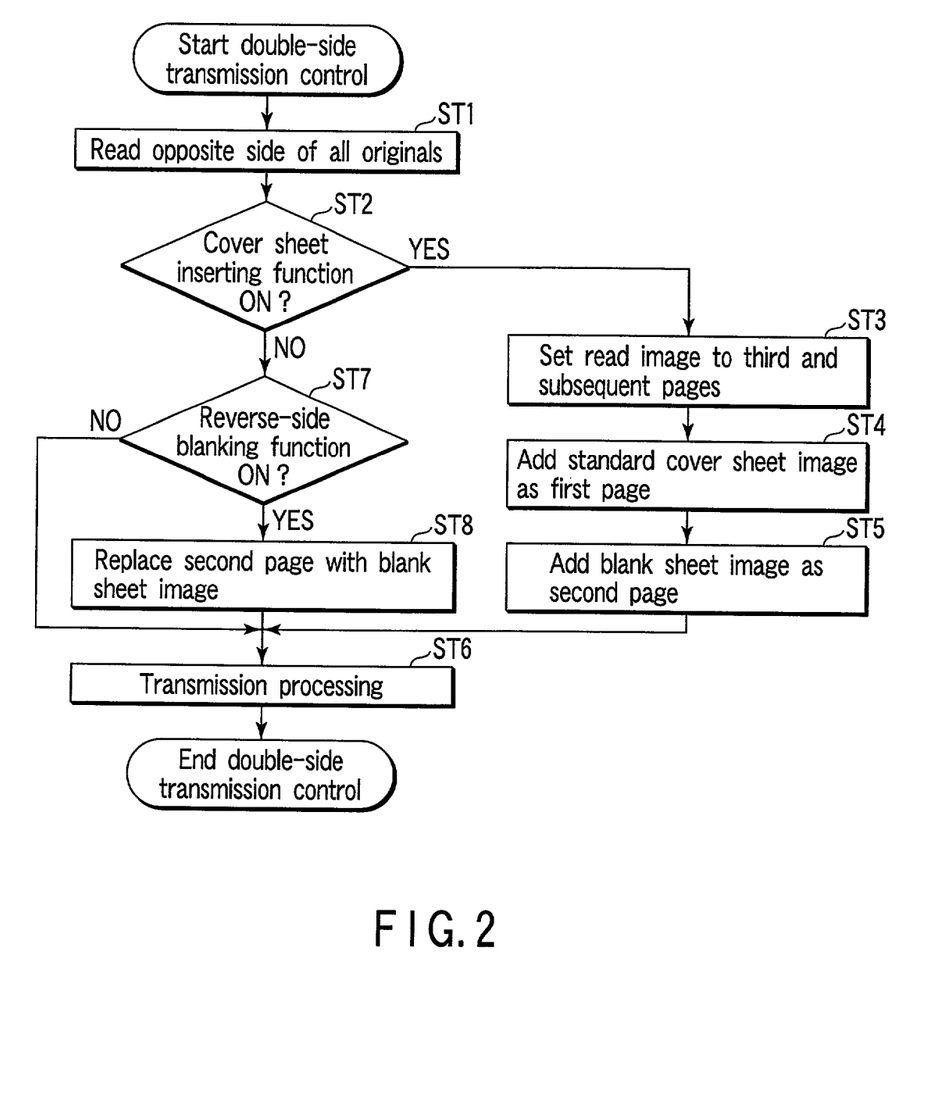
FIG. 2 is a flowchart explaining the double-side image transmission control performed in the first embodiment by CPU in FIG. 1.

Through negotiation with a communication destination it may be found necessary to perform double-side image transmission occurs. If this is the case, the CPU 1 executes a double-side image transmission control as shown in FIG. 2.

In the double-side image transmission control, the CPU 1 first allows the scanner 7 to read all opposite sides of originals set as transmission originals in the scanner 7 (step ST1). Additionally, each page of image data generated by the scanner 7 is stored in the image storage 5.

After completion of the reading of all originals, the CPU 1 determines whether or not a cover sheet inserting function is ON (step ST2). Here, the cover sheet inserting function is to automatically insert the cover sheet image stored in the image storage 5, as a top image of transmission images. A user may use the function or may not use it.

After determining that the cover sheet inserting function is ON, the CPU 1 sets the respective read images, obtained in the step ST1, to third and subsequent pages (step ST3). The CPU 1 adds the cover sheet image (hereinafter referred to as "standard cover sheet image") stored as a first page in the image storage 5 (step ST4). The CPU 1 then adds the blank sheet image as a second page (step ST5). Note that the blank sheet image is constituted only of white line data for one line.

Figure 3A:
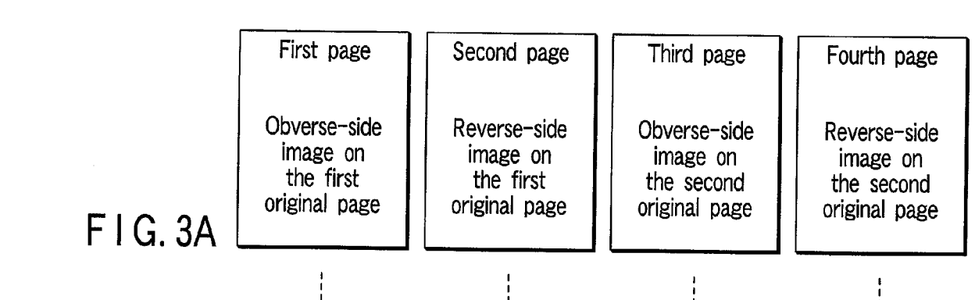
FIGS. 3A and 3B are diagram showing a standard cover sheet image and a blank sheet image, both inserted in the first embodiment.
Figure 3B:
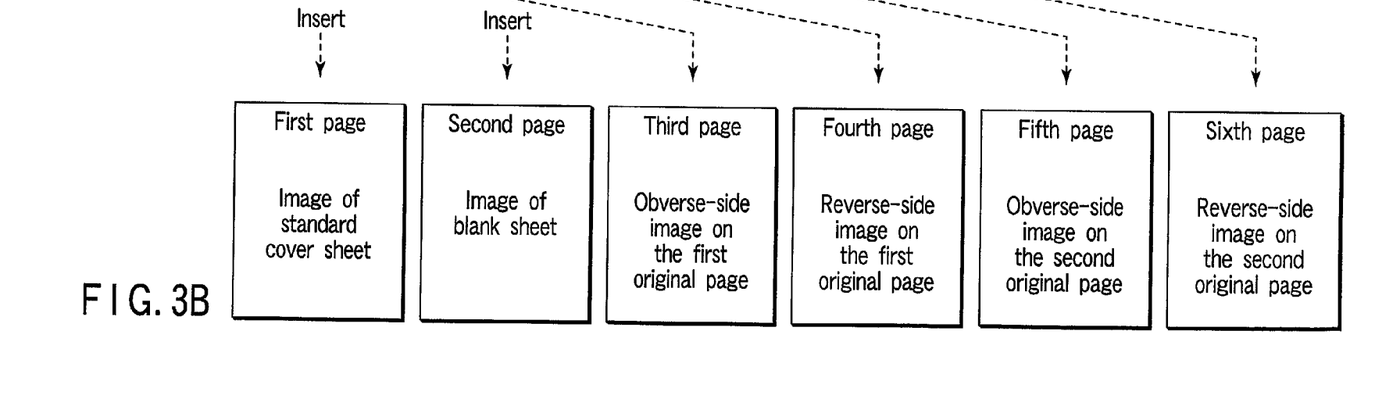

For example, there are two pages of originals, as a result of the original reading in the step ST1, as shown in FIG. 3A. In this case, four images for the first to fourth pages are sequentially obtained. The first image is the obverse-side image of the first page. The second image is the reverse-side image of the first page. The third image is the obverse-side image of the second page. The fourth image is the reverse-side image of the second page. Moreover, as shown in FIG. 3B, the standard cover sheet image and blank sheet image are inserted before these images. The four pages of images are shifted to third to six pages.

Thereafter, the CPU 1 sets a series of images with the standard cover sheet image and blank sheet image added thereto as described above as a transmission object. The CPU 1 then performs a facsimile transmission in a procedure conforming to ITU-T Recommendation T.30 (step ST6).

After completing the facsimile transmission, the CPU 1 ends double-side image transmission control.

On the other hand, when the cover sheet inserting function is OFF, and this is confirmed in the step ST2, the CPU 1 determines whether or not a reverse-side blanking function is ON (step ST7). Note that the reverse-side blanking function is to transmit the reverse-side image of the cover sheet as the blank sheet image when the user includes the cover sheet as the transmission original in the first page of originals set in the scanner 7. Moreover, the user may set or may not set this function.

Figure 4A:
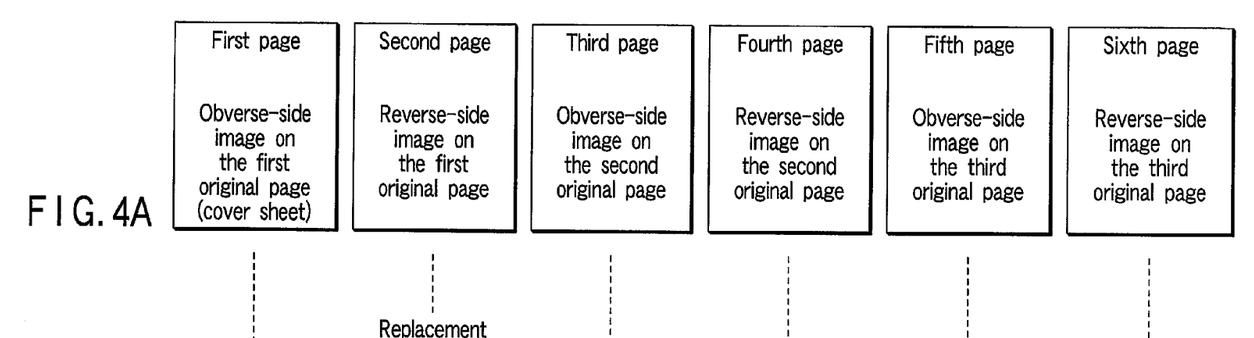
FIGS. 4A and 4B are diagram showing how a read image of a reverse side of a cover-sheet original is replaced by the blank sheet image in the first embodiment.
Figure 4B:
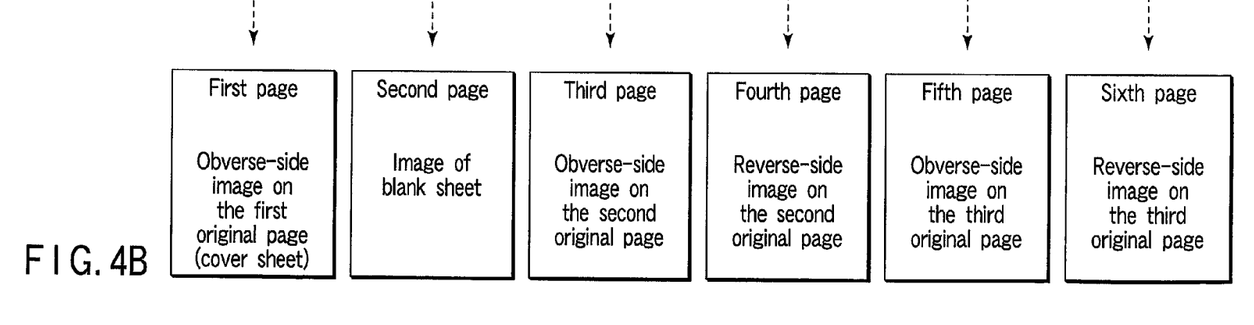

When confirming in the step ST7 that the reverse-side blanking function is ON, the CPU 1 replaces the second page among the respective images obtained in the step ST1, i.e., the image of the reverse side of the first page of original, for example, with the blank sheet image as shown in FIG. 4 (step ST8).

The CPU 1 sets the series of images with the second page, replaced with the blank sheet image, as the transmission object. The CPU 1 then performs the facsimile transmission processing in the step ST6, and terminates the double-side image transmission control upon completion of the facsimile transmission processing.

Additionally, when both the cover sheet inserting function and the reverse-side blanking function are OFF, the CPU 1 sets the respective images obtained in the step ST1, as the transmission object as they are. The CPU 1 then performs the facsimile transmission processing in the step ST6, and terminates the double-side image transmission control processing upon completion of the facsimile transmission.

In the first embodiment, the standard cover sheet image is inserted as the first page when the cover sheet inserting function is used to insert the cover sheet image. Then, the blank sheet image as the image of the reverse side of the standard cover sheet image is inserted as the second page. Therefore, the images having consecutive page numbers without being skipped are transmitted to a reception side from a transmission side. Even when a page missing is checked on the reception side, the page missing is not detected if the page missing by communication trouble does not occur. As a result, a page missing check processing can appropriately be operated, and it is possible to realize secure communication.

Moreover, according to the first embodiment, the reverse side of the cover sheet set as the first page of transmission original in the scanner 7 by the user is transmitted as the blank sheet image. For example, the cover sheet is prepared using the other side of the sheet having only one side used. Under this and other circumstances, even when the image not to be transmitted is formed on the reverse side of the cover sheet, the user may allow the opposite sides of the cover sheet to be read simultaneously with other originals. This is very convenient. Even in this case, the transmission of the image of the reverse side of the cover sheet is not skipped, and the image is replaced with the blank sheet image as described above. Therefore, similarly as a case in which the cover sheet inserting function is used, the check processing of the page missing in the reception side can appropriately be operated. Thus, reliable communication can be realized.

Moreover, in the first embodiment, the blank sheet image consists of only white line data for one line and a data amount of the blank sheet image is minimized. The increase in communication time, due to the transmission of the blank sheet image, can therefore be minimized.

In the first embodiment, only the blank sheet image is inserted as the image of the reverse side of the cover sheet, and a communication procedure is not changed at all. Therefore, with the facsimile apparatus conforming to the ITU-T Recommendation T.30, the aforementioned effect can be achieved even when facsimile transmission is performed with any facsimile apparatus as the communication destination.

(Second Embodiment)

Since the blank sheet image including no effective image has to be transmitted in the first embodiment, communication efficiency is slightly deteriorated.

Another embodiment in which the communication efficiency is not deteriorated will be described.

A hardware constitution of the facsimile apparatus in a second embodiment is similar to the constitution of the facsimile apparatus in the first embodiment shown in FIG. 1. Moreover, the facsimile apparatus of the second embodiment is different from that of the first embodiment in a function achieved by software process performed by the CPU 1. More specifically, in the second embodiment, the CPU 1 operates based on the control program stored in the ROM 2. The CPU 1 therefore operates not only as the control section for realizing the known function of the facsimile apparatus, but also as the double-side image transmitting section, additional page transmitting section, no-image notifying section, print control section and resending request section.

Here, the double-side image transmitting section and additional page transmitting section are the same as those of the first embodiment.

The no-image notifying section performs a processing of skipping transmission of the page of the reverse side of the cover sheet in order to blank the reverse side of the cover sheet, and notifying the reception side.

It is notified that the page missing of a received image occurs and the transmission of the page is skipped during double-side reception. In this case, the print control section controls printing in such a manner that the missed page is treated as the blank sheet image. In this manner, the print control section and printer 8 constitute a print section.

A resending request section sends a request for resending to a transmitter when the page missing of the received image occurs and the transmission skipping is not notified during the double-side reception.

An operation of the facsimile apparatus thus constructed will be described.

Figure 5:
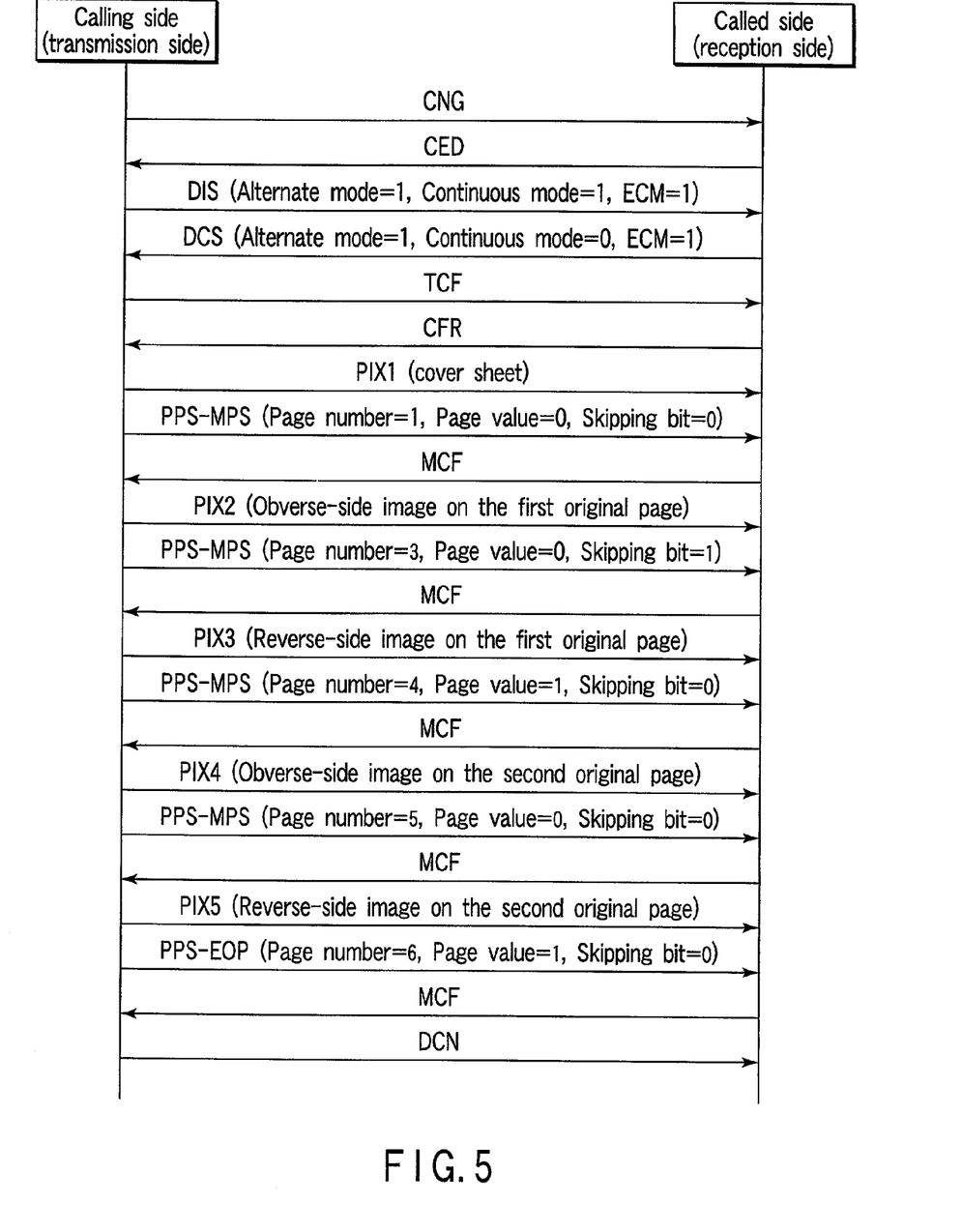
FIG. 5 is a diagram illustrating the sequence of double-side communication performed in alternate mode by the facsimile apparatus of a second embodiment.

FIG. 5 is a sequence diagram for performing double-side communication in an alternate mode by the facsimile apparatus of the second embodiment.

Even in the second embodiment, the cover sheet inserting function and reverse-side blanking function can be used similarly as the first embodiment. Moreover, when either one of these functions is ON, as shown in FIG. 5, the CPU 1 transmits the image of the cover sheet as a first transmission image PIX1, and then transmits the image of the obverse side of the next original as a second transmission image PIX2. That is, the image of the reverse side of the cover sheet is not transmitted.

Additionally, according to the procedure conforming to the ITU-T Recommendation T.30, as shown in FIG. 5, every time the transmission of image data for one page ends, PPS message such as PPS-MPS and PPS-EOP is transmitted to the reception side from the transmission side.

Figure 6:
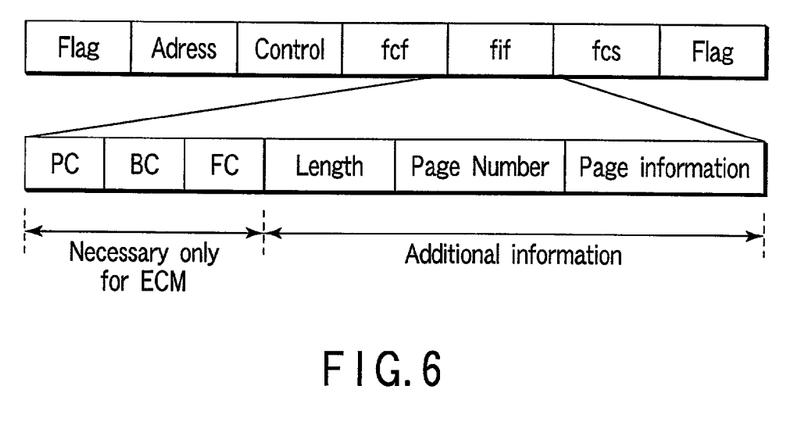
FIG. 6 is a diagram depicting a frame of a PPS message for use in the second embodiment.

The PPS message has a frame constitution as shown in FIG. 6, and additional information concerning double-side communication is inserted in a facsimile information field (fif).

Figure 7:
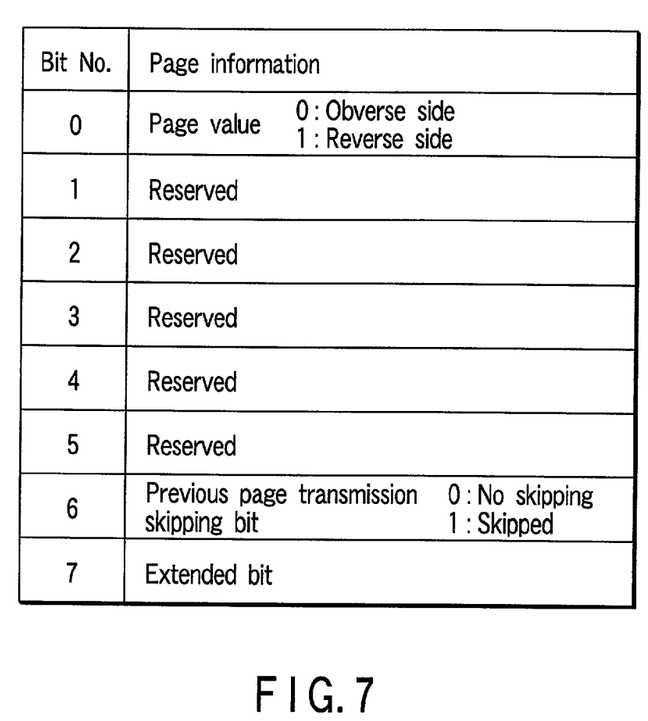
FIG. 7 is a diagram showing roles of respective bits constituting page information in FIG. 6.

The additional information includes three pieces of information: "Length"; "Page Number"; and "Page Information". The "Length" has a data size of one octet, and indicates a data length of the additional information. The "Page Number" has a data size of two octets, and indicates a page number of a previously transmitted image. Moreover, the "Page Information" has a data size of eight bits, and respective bits are assigned as shown in FIG. 7 and used as flags indicating various states.

That is, a bit No. 0 is defined as a page value according to the ITU-T Recommendation T.30. For the page value, "0" indicates the image formed on the obverse side, and "1" indicates the image of the reverse side.

A bit No. 6 is indicated as a previous page transmission skipping bit, but this is not defined in the ITU-T Recommendation T.30, and is particularly defined and used in the facsimile apparatus of the second embodiment. Moreover, in the second embodiment, when either one of the cover sheet inserting function and reverse-side blanking function is ON and the image of the reverse side of the cover sheet is therefore not transmitted, "1" is set as the previous page transmission skipping bit. Then, it is notified that the transmission of the image of the second page is skipped.

Figure 8:
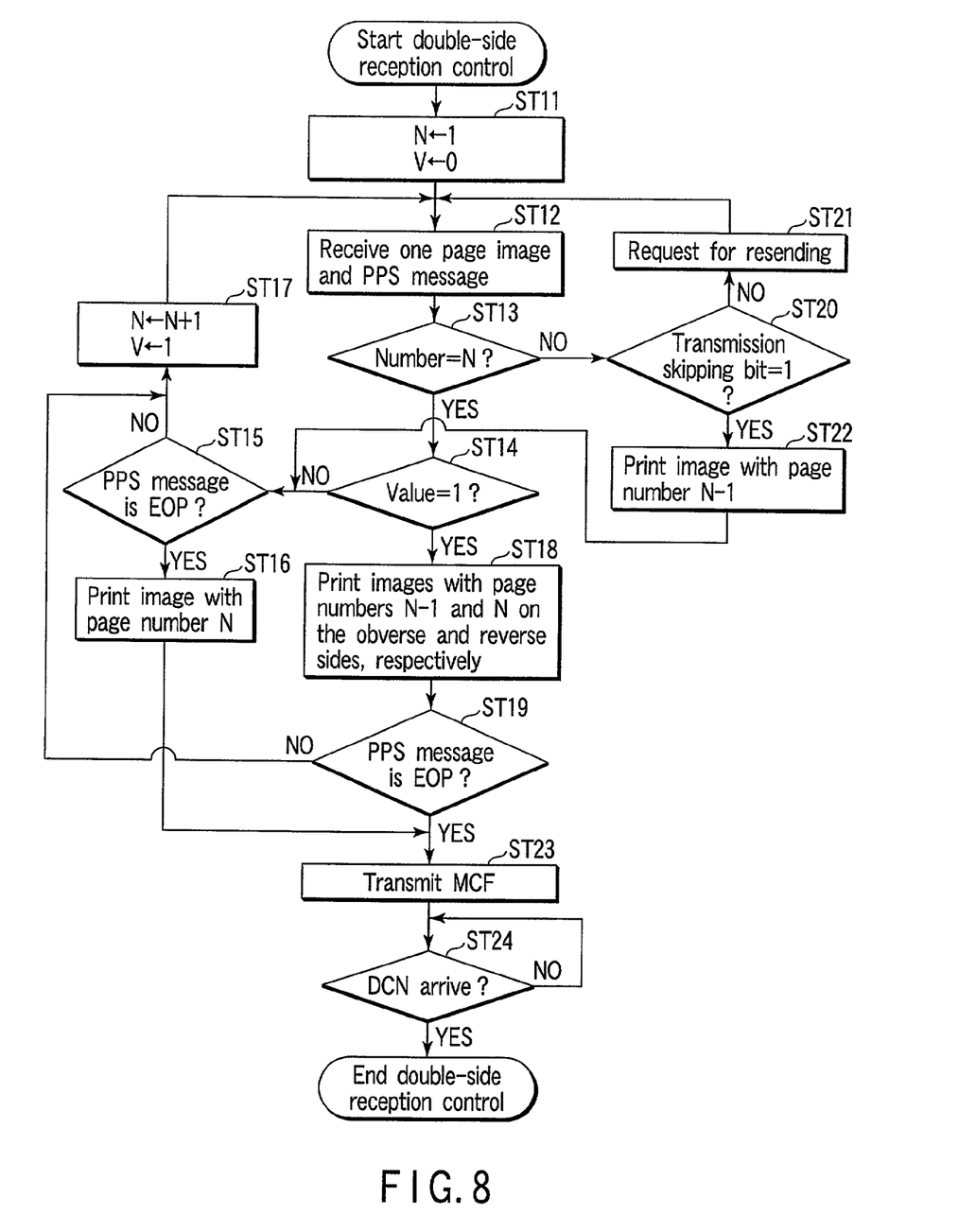
FIG. 8 is a flowchart explaining the double-side reception control carried out in the second embodiment by the CPU shown in FIG. 1.

On the other hand, when a necessity for performing the double-side reception occurs through the negotiation with the communication destination, the CPU 1 executes a double-side reception control as shown in FIG. 8.

In the double-side reception control, the CPU 1 first initializes a variable N for managing the page number of the received image to "1", and initializes a variable V to determine whether the received image belongs to the obverse side or the reverse side to "0" (step ST11).

Subsequently, the CPU 1 receives an image for one page and the PPS message that follows the image (step ST12). The CPU 1 determines whether or not the page number indicated in the PPS message agrees with the variable N (step ST13).

The variable N is "1" at the start of reception. The variable N is incremented by "+1" as described later every time the reception of the image for one page is completed. Therefore, if the image is correctly transmitted without being skipped, the page number should agree with the variable N. When confirming in the step ST13 that the page number indicated in the PPS message agrees with the variable N, the CPU 1 determines whether or not the page value indicated in the PPS message is "1", that is, whether or not the presently received image belongs to the reverse side (step ST14).

Here, when confirming that the presently received image belongs to the obverse side, the CPU 1 further judges whether or not the presently received PPS message is PPS-EOP (step ST15). Here, if the PPS message is PPS-EOP, the transmitted image belongs to the obverse side. This is the last page, and the reverse side does not exist. Then, the CPU 1 allows the printer 8 to print the image with a page number N, that is, only the presently received image (step ST16).

However, if the PPS message presently received is not PPS-EOP, the image of the reverse side of the image received is to come next. Therefore, the CPU 1 updates the variable N to N+1, and updates the variable V to "1" (step ST17), and the processing in and after the step ST12 is repeated.

In the steps ST13 and ST14 it is confirmed that the images correctly arrive without being skipped, and the image received belongs to the reverse side. Then, the CPU 1 sets an image with a page number N−1 for the obverse side, and sets an image with a page number N for the reverse side. The CPU 1 then allows the printer 8 to print these images on the obverse and reverse sides, respectively (step ST18).

Subsequently, the CPU 1 determines whether or not the PPS message presently received is PPS-EOP (step ST19). If the PPS message is not PPS-EOP, the CPU 1 performs a processing in and after the step ST17 and receives the next image.

As described above, during receiving/printing of the respective page images, it is confirmed in the step ST13 that the image is missing and the page number is different from the variable N. The CPU 1 determines whether or not the transmission skipping bit indicated in the PPS message is "1" (step ST20). When the transmission side skips transmission of a blank page, the transmission skipping bit is "1" as described above. When the page is missing because of communication trouble, the transmission skipping bit is "0". In the step ST20 the CPU 1 confirms that the transmission skipping bit is "0." The CPU 1 requests the transmission side for resending as a processing for handling the transmission trouble (step ST21). Moreover, the processing in and after the step ST12 is repeated.

However, the transmission skipping bit is "1." It can be seen that the page with the page number N is blank. Thus, the CPU 1 allows the printer 8 to perform one-side printing while the image with a page number N−1 is set on the obverse side (step ST22). In this case, the CPU 1 performs the processing in and after the step ST15 similarly as described above.

After the printing of the image of the final page is completed in the step ST16, or when the presently received PPS message is confirmed to be PPS-EOP in the step ST19, the CPU 1 transmits MCF command to the transmission side (step ST23). The CPU 1 waits for arrival of DCN command from the transmission side (step ST24). When the DCN command arrives, the CPU 1 terminates the double-side reception control.

Figure 9:
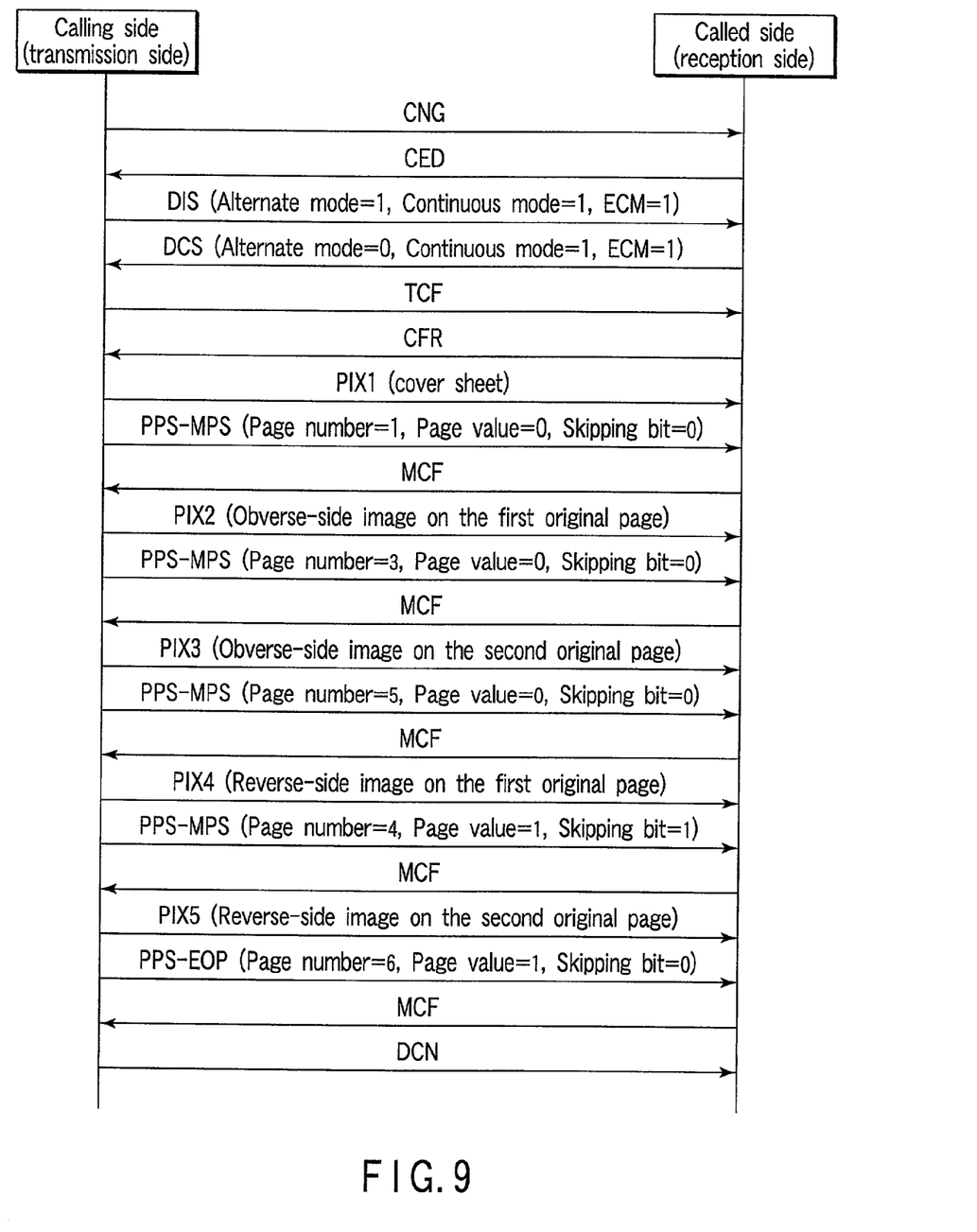
FIG. 9 is a diagram illustrating the sequence of performing the double-side communication in continuous mode by the facsimile apparatus of the second embodiment.

Additionally, the number of originals excluding the original of the cover sheet is, for example, two in the continuous mode. An inherent transmission timing of the image of the reverse side of the cover sheet lies between the time an image PIX3 of the obverse side of the second page of original is transmitted and the time an image PIX4 of the reverse side of the first page of original is transmitted. However, as shown in FIG. 9, the transmission of the page is skipped. Moreover, the previous-page transmission skipping bit is "1" in the PPS message concerning the image PIX4.

As described above, according to the second embodiment, the transmission of the reverse side of the cover sheet is skipped, and facsimile communication can be accomplished at high efficiency.

Moreover, in the second embodiment, the previous-page transmission skipping bit is set in the PPS message, and it is notified to the transmission side from the reception side whether or not the previous-page transmission skipping bit is used to perform transmission skipping. Moreover, the page numbers of the received images are not continuous and are skipped during reception. In this case, the previous-page transmission skipping bit notifies that the transmission skipping is performed. It is then determined that the skipped page is the blank sheet image, and the printing is performed. On the other hand, the previous-page transmission skipping bit notifies that the transmission skipping is not performed. It is then judged that the communication has a trouble, and the resending is requested. As a result, the page missing check processing on the reception side can appropriately be operated, and reliable communication can be effected.

In the second embodiment, the previous-page transmission skipping bit not defined in the ITU-T Recommendation T.30 is used. Therefore, the embodiment can fulfill its effect only during the facsimile communication among adapted exclusive-use facsimile apparatuses. In the second embodiment, the bit prepared in the ITU-T Recommendation T.30 is used as the previous-page transmission skipping bit. Therefore, it is possible to adapt the existing facsimile apparatus to the second embodiment with a simple constitution change.

The present invention is not limited to the aforementioned respective embodiments. In the embodiments, the cover sheet is inserted before the read image in the cover sheet inserting function, and the page (second page) next to the cover sheet is the blank sheet image. Nonetheless, some image may be inserted between the read images, and the next page can be the blank sheet image.

In the respective embodiments, the reverse-side blanking function is based on the assumption that the top of the read original is the cover sheet and that the second page is the blank sheet image. A user designation of the page number of the original whose reverse side is not to be transmitted may be accepted, and it is possible to replace the corresponding image of the reverse side of the original with the blank sheet image. In this case, a plurality of originals whose reverse sides are not to be transmitted may be designated, and it is also possible to replace the respective images of the reverse sides of the originals with the blank sheet images. Then, the originals may be read and transmitted as they are, even when the original having the reverse side utilized is mixed with the double-side original. This is very convenient.

Figure 10:
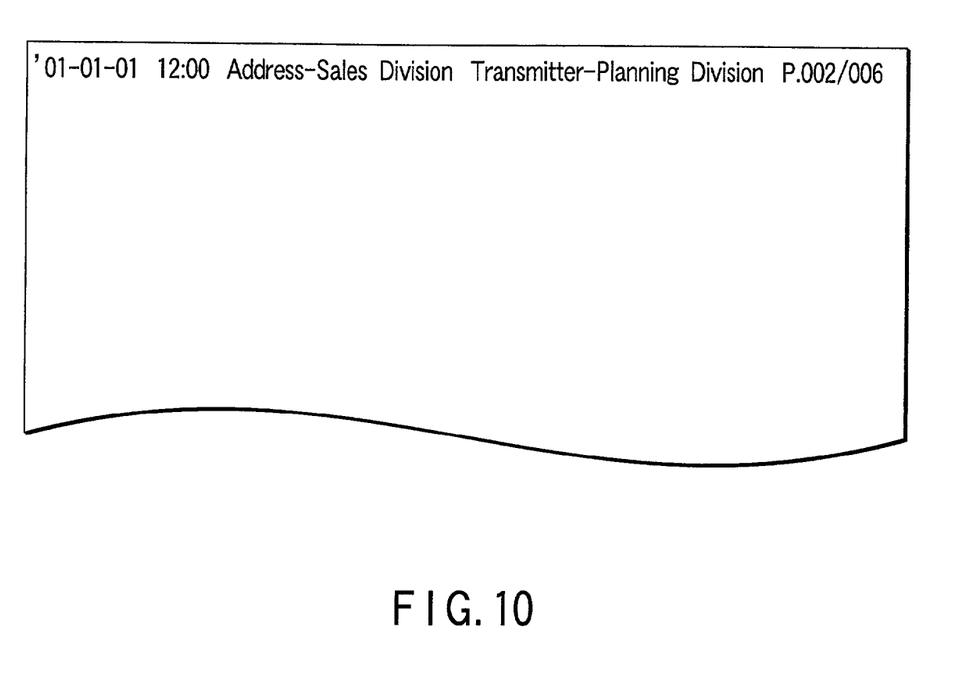
FIG. 10 is a diagram showing a modification of an image to be transmitted as a reverse-side image.

Additionally, in the embodiments, the blank sheet image is transmitted as the reverse side of the cover sheet. Nevertheless, as shown in FIG. 10, an image including only a transmission header indicating transmission information may be transmitted. In FIG. 10, the transmission information includes a transmission date, address name, transmitter name and page number, but the information included in the transmission information may be arbitrary.

In the second embodiment, the transmission skipping is notified in the PPS message defined by the ITU-T Recommendation T.30. Instead, the transmission skipping may be notified by transmitting/receiving a command which is different from/independent of this PPS message.

In the second embodiment, the double-side communication protocol for use is defined by the ITU-T Recommendation T.30. Nonetheless, the present invention can also be applied to any case where the individual protocol or any other protocol is used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A facsimile apparatus comprising:
    a double-side image transmitting section configured to set an image formed on each side of an original sheet as an original image corresponding to one page, and to transmit a plurality of said pages corresponding to images formed on obverse and reverse sides of each said original sheet;
    an additional page transmitting section configured to automatically transmit a predetermined additional image as one page in a predetermined position with respect to the plurality of pages of images; and a no-image notifying section configured to skip transmission of an image corresponding to a reverse side of the additional image transmitted by the additional page transmitting section, and to transmit predetermined notification information for notifying a reception side that the transmission of said image corresponding to the reverse side has been skipped;

wherein said double-side image transmitting section utilizes a double-side communication protocol which conforms to Recommendation T.30 of International Telecommunication Union-Telecommunication sector (ITU-T), and wherein said no-image notifying section adds said notification information to indicate that transmission of a previous image has been skipped into a post message concerning an image to be transmitted immediately after skipping of the transmission of the previous image.

2. The facsimile apparatus according to claim 1, wherein said additional image is a cover sheet for transmission.

3. The facsimile apparatus according to claim 1, wherein said additional page transmitting section transmits said additional image as a first page of a facsimile transmission.

4. The facsimile apparatus according to claim 1, wherein said post message comprises a facsimile information field including a page number and page information.

5. The facsimile apparatus according to claim 4, wherein said no-image notifying section sets a state of a predetermined flag prepared for said page information depending upon whether or not the transmission of the previous image is skipped.

6. A facsimile apparatus comprising:

a reading section configured to set an original image formed on each side of an original sheet as an original image corresponding to one page, and to read original images formed on obverse and reverse sides of each said original sheet;

a double-side image transmitting section configured to transmit the original images read by the reading section; and a no-image notifying section configured to skip transmission of the original image read by the reading section from the reverse side of a predetermined said original sheet, and to transmit predetermined notification information for notifying a reception side that the transmission of said original image from the reverse side of said predetermined original sheet has been skipped;

wherein said double-side image transmitting section utilizes a double-side communication protocol which conforms to Recommendation T.30 of International Telecommunication Union-Telecommunication sector (ITU-T), and wherein said no-image notifying section adds said notification information to indicate that the transmission of a previous image has been skipped into a post message concerning an image to be transmitted immediately after the skipping of the transmission of the previous image.

7. The facsimile apparatus according to claim 6, wherein said predetermined original sheet is a cover sheet for transmission.

8. The facsimile apparatus according to claim 6, wherein said predetermined original sheet is a first page.

9. The facsimile apparatus according to claim 6, wherein said post message has a facsimile information field including a page number and page information.

10. The facsimile apparatus according to claim 9, wherein said no-image notifying section sets a state of a predetermined flag prepared for said page information depending upon whether or not the transmission of the previous image is skipped.

11. A facsimile transmitting method comprising:

setting an image formed on each side of an original sheet as an original image corresponding to one page, and transmitting a plurality of said pages corresponding to images formed on obverse and reverse sides of each said original sheet;

automatically transmitting a predetermined additional image as one page in a predetermined position with respect to the plurality of pages of images; and skipping transmission of an image corresponding to a reverse side of the transmitting additional image, and transmitting predetermined notification information for notifying a reception side that the transmission of said image corresponding to the reverse side has been skipped;

wherein said plurality of pages are transmitted utilizing a double-side communication protocol which conforms to Recommendation T.30 of International Telecommunication Union-Telecommunication sector (ITU-T), and wherein said predetermined notification information is transmitted by adding said notification information to indicate that the transmission of a previous image has been skipped into a post message concerning an image to be transmitted immediately after skipping of the transmission of the previous image.

12. The method according to claim 11, wherein said post message comprises a facsimile information field including a page number and page information.

13. The method according to claim 12, wherein a state of a predetermined flag prepared for said page information is set depending upon whether or not the transmission of the previous image is skipped.

14. The method according to claim 12, wherein said additional image is a cover sheet for transmission.

15. The method according to claim 12, wherein said additional image is transmitted as a first page of a facsimile transmission.

16. A facsimile transmitting method comprising:

setting an original image formed on each side of an original sheet as an original image corresponding to one page, and reading original images formed on obverse and reverse sides of each said original sheet;

transmitting the original images read by the reading section; and skipping transmission of the original image read from the reverse side of a predetermined said original sheet, and transmitting predetermined notification information for notifying a reception side that the transmission of said original image from the reverse side of said predetermined original sheet has been skipped;

wherein said original images are transmitted utilizing a double-side communication protocol which conforms to Recommendation T.30 of International Telecommunication Union-Telecommunication sector (ITU-T), and wherein said predetermined notification information is transmitted by adding said notification information to indicate that the transmission of a previous image has been skipped into a post message concerning an image to be transmitted immediately after the skipping of the transmission of the previous image.

17. The method according to claim 16, wherein said post message has a facsimile information field including a page number and page information.

18. The method according to claim 17, wherein a state of a predetermined flag prepared for said page information is set depending upon whether or not the transmission of the previous image is skipped.

19. The method according to claim 16, wherein said predetermined original sheet is a cover sheet for transmission.

20. The method according to claim 16, wherein said predetermined original sheet is a first page.

21. A facsimile apparatus comprising:
double-side image transmitting means for setting an image formed on each side of an original sheet as an original image corresponding to one page, and for transmitting a plurality of said pages corresponding to images formed on obverse and reverse sides of each said original sheet;
additional page transmitting means for automatically transmitting a predetermined additional image as one page in a predetermined position with respect to the plurality of pages of images; and
no-image notifying means for skipping transmission of an image corresponding to a reverse side of the additional image transmitted by the additional page transmitting means, and for transmitting predetermined notification information for notifying a reception side that the transmission of said image corresponding to the reverse side has been skipped;
wherein said double-side image transmitting means utilizes a double-side communication protocol which conforms to Recommendation T.30 of International Telecommunication Union-Telecommunication sector (ITU-T), and
wherein said no-image notifying means adds said notification information to indicate that transmission of a previous image has been skipped into a post message concerning an image to be transmitted immediately after skipping of the transmission of the previous image.

22. The facsimile apparatus according to claim 21, wherein said post message comprises a facsimile information field including a page number and page information.

23. The facsimile apparatus according to claim 22, wherein said no-image notifying means sets a state of a predetermined flag prepared for said page information depending upon whether or not the transmission of the previous image is skipped.

24. The facsimile apparatus according to claim 21, wherein said additional image is a cover sheet for transmission.

25. The facsimile apparatus according to claim 21, wherein said additional page transmitting means transmits said additional image as a first page of a facsimile transmission.

26. A facsimile apparatus comprising:
reading means for setting an original image formed on each side of an original sheet as an original image corresponding to one page, and for reading original images formed on obverse and reverse sides of each said original sheet;
double-side image transmitting means for transmitting the original images read by the reading means; and
no-image notifying means for skipping transmission of the original image read by the reading means from the reverse side of a predetermined said original sheet, and for transmitting predetermined notification information for notifying a reception side that the transmission of said original image from the reverse side of said predetermined original sheet has been skipped;
wherein said double-side image transmitting means utilizes a double-side communication protocol which conforms to Recommendation T.30 of International Telecommunication Union-Telecommunication sector (ITU-T), and
wherein said no-image notifying means adds said notification information to indicate that the transmission of a previous image has been skipped into a post message concerning an image to be transmitted immediately after the skipping of the transmission of the previous image.

27. The facsimile apparatus according to claim 26, wherein said post message has a facsimile information field including a page number and page information.

28. The facsimile apparatus according to claim 27, wherein said no-image notifying means sets a state of a predetermined flag prepared for said page information depending upon whether or not the transmission of the previous image is skipped.

29. The facsimile apparatus according to claim 26, wherein said predetermined original sheet is a cover sheet for transmission.

30. The facsimile apparatus according to claim 26, wherein said predetermined original sheet is a first page.

* * * * *